US008543456B2

(12) United States Patent
McKay

(10) Patent No.: US 8,543,456 B2
(45) Date of Patent: Sep. 24, 2013

(54) MEDIA TARGETING SYSTEM AND METHOD

(75) Inventor: Brent Thomas McKay, Newport Beach, CA (US)

(73) Assignee: IP Mining Corporation, Newport Beach, CA (US)

( * ) Notice: Subject to any disclaimer, the term of this patent is extended or adjusted under 35 U.S.C. 154(b) by 2051 days.

(21) Appl. No.: 11/012,055

(22) Filed: Dec. 13, 2004

(65) Prior Publication Data

US 2005/0149398 A1     Jul. 7, 2005

Related U.S. Application Data

(60) Provisional application No. 60/529,044, filed on Dec. 15, 2003.

(51) Int. Cl.
*G06Q 30/00* (2012.01)

(52) U.S. Cl.
USPC ............ 705/14.5; 705/14.52; 705/14.57; 705/14.58; 705/14.66

(58) Field of Classification Search
USPC ............ 705/14, 14.41, 14.45, 14.5, 14.52, 705/14.57, 14.66
See application file for complete search history.

(56) References Cited

U.S. PATENT DOCUMENTS

| | | |
|---|---|---|
| 3,366,731 A | 1/1968 | Wallerstein |
| 3,639,686 A | 2/1972 | Walker |
| 4,331,974 A | 5/1982 | Cogswell |
| 4,581,762 A | 4/1986 | Lapidus et al. |
| 4,602,279 A | 7/1986 | Freeman |
| 5,029,014 A | 7/1991 | Lindstrom |
| 5,155,591 A | 10/1992 | Wachob |
| 5,446,919 A | 8/1995 | Wilkins |
| 5,515,098 A | 5/1996 | Carles |
| 5,600,366 A | 2/1997 | Schulman |
| 5,636,346 A | 6/1997 | Saxe |
| 5,715,018 A | 2/1998 | Fasciano et al. |
| 5,754,939 A | 5/1998 | Herz et al. |
| 5,758,257 A | 5/1998 | Herz et al. |
| 6,020,883 A | 2/2000 | Hertz et al. |
| 6,026,368 A | 2/2000 | Brown et al. |
| 6,026,369 A | 2/2000 | Capek et al. |
| 6,055,513 A * | 4/2000 | Katz et al. .............. 705/26 |
| 6,112,192 A | 8/2000 | Capek |
| 6,216,129 B1 | 4/2001 | Eldering |
| 6,236,977 B1 * | 5/2001 | Verba et al. .............. 705/10 |
| 6,286,005 B1 | 9/2001 | Cannon |

(Continued)

OTHER PUBLICATIONS

U.S. Appl. No. 10/425,489, filed Apr. 2003, Sharma et al.*

(Continued)

*Primary Examiner* — James W Myhre
*Assistant Examiner* — Michael Goldman
(74) *Attorney, Agent, or Firm* — Knobbe Martens Olson & Bear LLP

(57) ABSTRACT

A media targeting system and method uses visual pattern recognition techniques in association with consumer transactions as the basis for building a targeting database, which is then later used for automated consumer identification and targeted advertising purposes. The invention solves the problem of generating a large scale, robust media targeting database without relying on active or passive participation by consumers. Also disclosed are other demographics estimation systems and methods which facilitate less expensive media targeting capabilities which can be used in conjunction with the more robust transaction associated method disclosed.

18 Claims, 4 Drawing Sheets

Media Targeting Data Warehouse

(56) References Cited

U.S. PATENT DOCUMENTS

| | | | |
|---|---|---|---|
| 6,298,348 B1 | 10/2001 | Eldering | |
| 6,314,451 B1 | 11/2001 | Landsman et al. | |
| 6,324,519 B1 | 11/2001 | Eldering | |
| 6,408,278 B1 | 6/2002 | Carney et al. | |
| 6,434,747 B1 | 8/2002 | Khoo et al. | |
| 6,446,261 B1 | 9/2002 | Rosser | |
| 6,484,148 B1 | 11/2002 | Boyd | |
| 6,505,169 B1 | 1/2003 | Bhagavath et al. | |
| 6,535,132 B2 | 3/2003 | Waters et al. | |
| 6,560,578 B2 | 5/2003 | Eldering | |
| 6,571,279 B1 | 5/2003 | Herz et al. | |
| 6,587,127 B1 | 7/2003 | Leeke et al. | |
| 6,601,041 B1 | 7/2003 | Brown et al. | |
| 6,604,138 B1 | 8/2003 | Virine et al. | |
| 6,615,039 B1 | 9/2003 | Eldering | |
| 6,622,125 B1 | 9/2003 | Cragun et al. | |
| 6,671,736 B2 | 12/2003 | Virine et al. | |
| 6,684,194 B1 | 1/2004 | Eldering et al. | |
| 6,684,195 B1 * | 1/2004 | Deaton et al. | 705/14 |
| 6,698,020 B1 | 2/2004 | Zigmond et al. | |
| 6,704,930 B1 | 3/2004 | Eldering et al. | |
| 6,708,156 B1 | 3/2004 | Gonten | |
| 6,745,184 B1 | 6/2004 | Choi et al. | |
| 6,748,426 B1 | 6/2004 | Safer et al. | |
| 6,757,661 B1 | 6/2004 | Blaser et al. | |
| 6,783,459 B2 | 8/2004 | Cumbers | |
| 6,904,168 B1 | 6/2005 | Steinberg et al. | |
| 6,912,398 B1 * | 6/2005 | Domnitz | 455/461 |
| 6,947,897 B2 * | 9/2005 | Lortscher et al. | 705/14.36 |
| 7,043,445 B2 * | 5/2006 | Bailey | 705/10 |
| 7,225,414 B1 * | 5/2007 | Sharma et al. | 715/863 |
| 7,283,650 B1 * | 10/2007 | Sharma et al. | 382/118 |
| 7,288,025 B1 | 10/2007 | Cumbers | |
| 7,383,243 B2 * | 6/2008 | Conkwright et al. | 707/1 |
| 7,412,398 B1 * | 8/2008 | Bailey | 705/10 |
| 7,419,427 B2 | 9/2008 | Boushy | |
| 7,464,155 B2 * | 12/2008 | Mousavi et al. | 709/224 |
| 7,529,195 B2 * | 5/2009 | Gorman | 370/254 |
| 2002/0016740 A1 | 2/2002 | Ogasawara | |
| 2002/0111154 A1 | 8/2002 | Eldering et al. | |
| 2002/0128908 A1 | 9/2002 | Levin et al. | |
| 2002/0144263 A1 | 10/2002 | Eldring et al. | |
| 2002/0165781 A1 | 11/2002 | McKay | |
| 2003/0023726 A1 | 1/2003 | Rice et al. | |

OTHER PUBLICATIONS

"*What Should We Call Our New Media Networks?, Some Executives Think We Need a Brand, But Others Believe the Market Will Provide*", Narrowcasting News From Bill Collins, Nov. 5, 2003, vol. I, Issue 5, pp. 1-3, Nov. 5, 2003.

"*WayFinder42 Commercial Digital Signage, Advanced Technology for Demanding Applications*", Interactive Media Network.

GISmonitor, "*Ultimate Map/GIS Directory*," http://www.gismonitor.com/news/newsletter/archive/031501.php, 7 pages, downloaded and printed from the World Wide Web on or about Jan. 14, 2006.

"Interactive Directory", Plasma Display and Information System.

Google search, "Publisher of USA Today Newspaper, Acquires Captivate Elevator Network," http://66.102.7.104/search?q=cache:-6UGSX07pkJ:www.aka.tv/issueone/iss 1artn.asp++%22Elevator+News+Network%22& . . . , 3 pages, downloaded and printed from the World Wide Web on or about Jan. 21, 2006.

"*Elevator News Network is coming to New York. (Brief Article)*", HighBeam Research.

Google Search, "Outdoor Broadcast Network Plans to Open 18-Story Media Tower at Toronto's Eaton Centre in November 2004", http://66.102.7.104/search?q=cache:dfJukTblDgoJ:wwwaka.tv/issuetwo/iss2art13.asp++%22Elevator+News+Network%22&hl . . . , 6 pages, downloaded and printed from the World Wide Web on or about Jan. 21, 2006.

\* cited by examiner

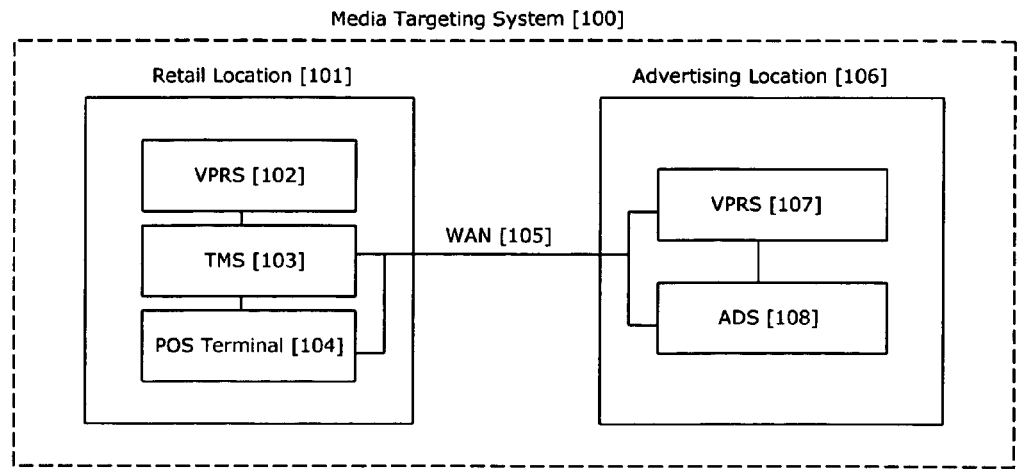
FIG 1. Media Targeting System
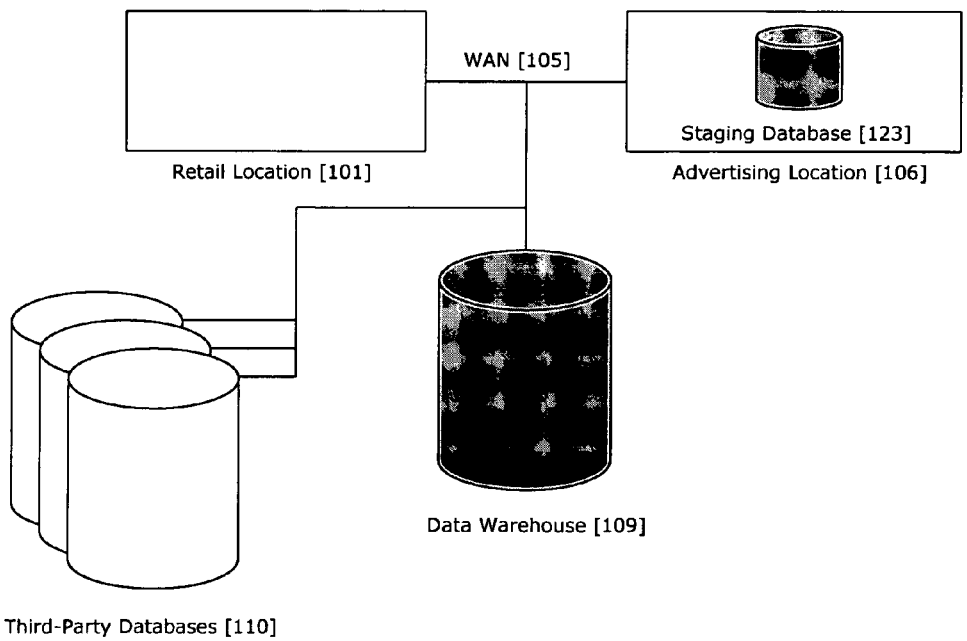
FIG 2. Media Targeting Data Warehouse

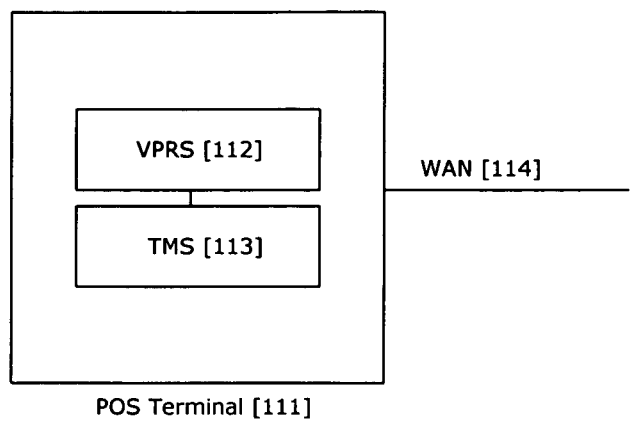
FIG 3. Alternate Retail Hardware Configuration
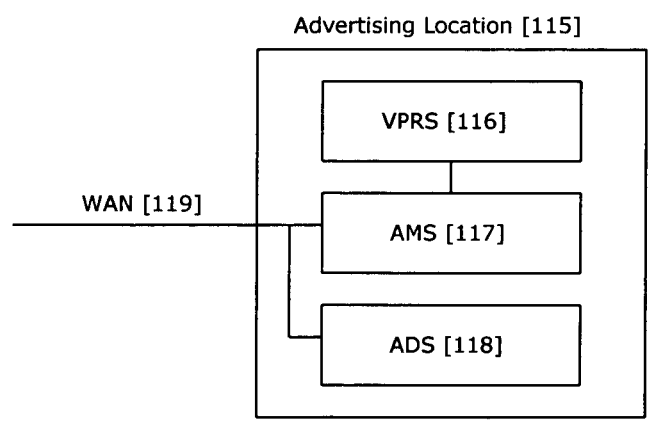
FIG 4. Alternate Ad Location Hardware Configuration

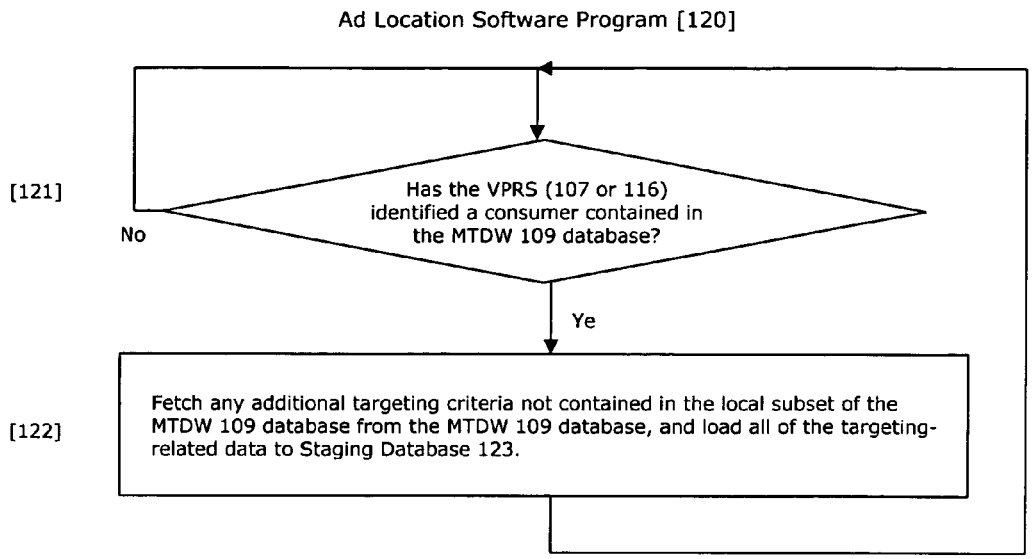
FIG 5. Staging Database Generation Software Flowchart
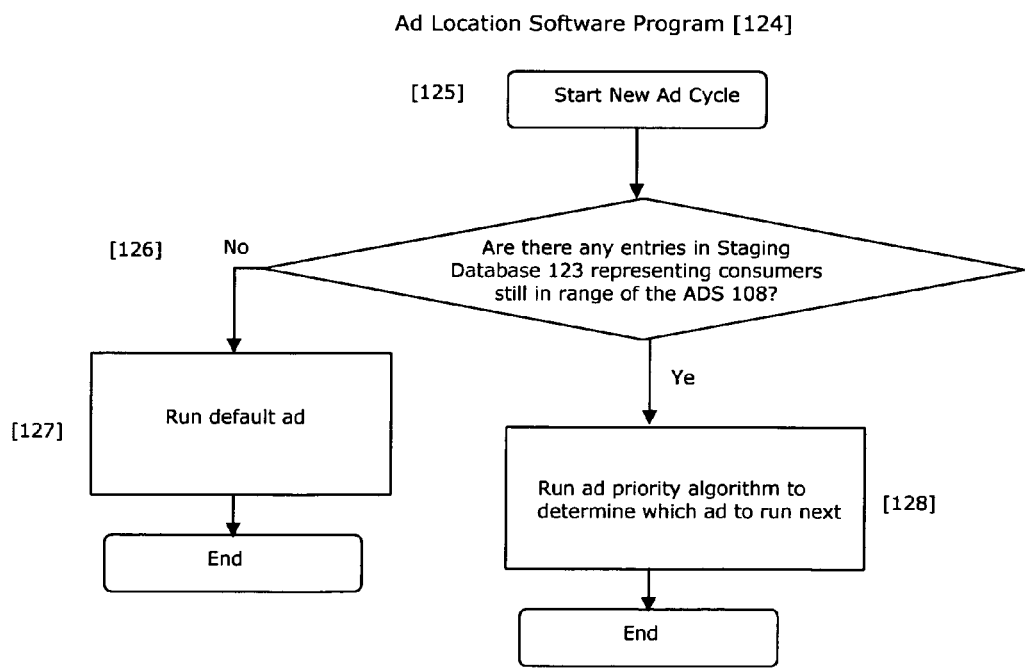
FIG 6. Media Scheduling Engine Software Flowchart

[129] Level One: *Average Demographic Profile* using U.S. Census Bureau Database

[130] Level Two: *Estimated Demographic Profile* using Visual Pattern Analysis

[131] Level Three: *Actual Demographic Profile* using the Media Targeting System (100)

FIG 7. Multi-Level Demographics Targeting System

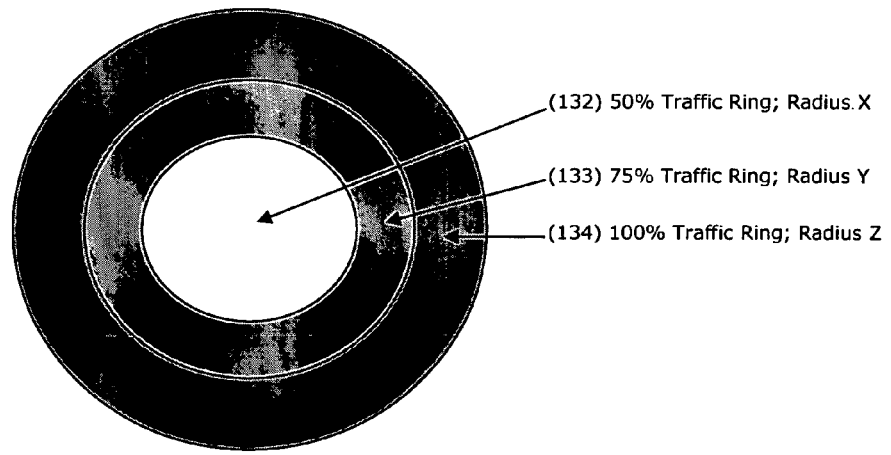

(132) 50% Traffic Ring; Radius X (133) 75% Traffic Ring; Radius Y (134) 100% Traffic Ring; Radius Z

FIG 8. First-Order Traffic Profile Estimation

MEDIA TARGETING SYSTEM AND METHOD

PRIORITY CLAIM

This patent application claims the benefit of the filing date of the U.S. Provisional Patent Application Ser. No. 60/529,044, filed Dec. 15, 2003 and entitled MEDIA TARGETING SYSTEM AND METHOD, the entire contents of which are hereby expressly incorporated by reference.

FIELD OF THE INVENTION

This invention relates to media targeting systems and, in particular, to a system for customizing the digital advertising that is displayed to viewers in public spaces based on using visual pattern recognition techniques in association with previous retail transactions as the basis for building a targeting database and delivering targeted advertising. The field of invention is related to, and alternately referred to as "digital signage," "dynamic signage," and "narrowcasting."

BACKGROUND OF THE INVENTION

Digital Signage is an emerging visual advertising medium which utilizes digital displays deployed into public spaces, connected through a wide area network, which display visual advertising messages to individuals within the visual range of the display ("local traffic"). The advertising media takes the form of digital files which are distributed electronically over the network to the remote display system to be run on the display in accordance with some predetermined criteria.

Early implementations of Digital Signage used a simple media loop in which a number of still images ("media segments") would be displayed in series, each for a period of time, and the cycle would be continuously repeated throughout the day. In this mode, the advertising medium took on the same basic characteristics as traditional static poster advertising except that the ads could be more readily distributed and more highly multiplexed. In spite of these advantages, the display site did not increase the total media value sufficiently to overcome the increased costs of deploying and maintaining the Digital Signs.

In response to this problem, there have been efforts to design "media targeting" systems which tailor the media segments more specifically to the characteristics of the local traffic of a particular display at a given moment, as opposed to running the same loop continuously on all of the displays. By doing so, the total media value of a display site could be raised; if the media targeting is sufficiently robust it could raise the media value of the site enough to overcome the increased costs and thereby support a viable business model.

There are three basic classes of media targeting on a Digital Signage network: 1) those based on the typical demographic characteristics of consumers in the vicinity of the sign with no additional real-time demographics information (Average Demographic Profile), 2) those based on an estimation of the real-time demographics information of consumers in the vicinity of the sign without the benefit of direct consumer identification (Estimated Demographic Profile), and 3) those based on actual real-time consumer demographics information determined by some kind of direct consumer identification method (Actual Demographic Profile).

In general, Actual Demographics Profile systems are preferred in that they more accurately reflect the real-time consumer demographics profile in the vicinity of the sign. However, if an Actual Demographics Profile system is only able to identify a small percentage of the consumers in the vicinity of the sign, then the usefulness of such a system is diminished. Therefore, a robust media targeting system requires not only Actual Demographic Profile capabilities, but the ability to identify a significant percentage of the consumers in the vicinity of the sign.

While Actual Demographics Profile systems are preferred, any method which provides improved demographics profiling capabilities is useful. In order to illustrate this point, consider a Digital Sign in a U.S location which had no additional demographics data associated with it. From an advertiser's perspective, it would be assumed to have the average demographics profile of the U.S population (typically stated as a probabilistic profile). Taking one possible demographics vector, household income, the sign could be modeled by the following table:

| PERCENT DISTRIBUTION | |
| --- | --- |
| Total | 100.0 |
| Less than $10,000 | 9.5 |
| $10,000 to $14,999 | 6.3 |
| $15,000 to $19,999 | 6.3 |
| $20,000 to $24,999 | 6.6 |
| $25,000 to $29,999 | 6.4 |
| $30,000 to $34,999 | 6.4 |
| $35,000 to $39,999 | 5.9 |
| $40,000 to $44,999 | 5.7 |
| $45,000 to $49,999 | 5.0 |
| $50,000 to $59,999 | 9.0 |
| $60,000 to $74,999 | 10.4 |
| $75,000 to $99,999 | 10.2 |
| $100,000 to $124,999 | 5.2 |
| $125,000 to $149,999 | 2.5 |
| $150,000 to $199,999 | 2.2 |
| $200,000 or more | 2.4 |

For an advertiser interested in consumers whose household income was between $25,000 and $35,000, 12.8% of the actual impressions would be of value (sum of "$25,000 to $29,999" and "$30,000 to $34,999" percentage values). Now, assume that the same Digital Sign was characterized as having 18.4% of the consumers meeting this description: the corresponding value to this advertiser was just raised 43%.

The basic requirements for creating a robust media targeting system include: 1) the ability to automatically identify in real-time some individual characteristic of a significant percentage of the individuals comprising the local traffic which can be used to uniquely identify the consumer, 2) the ability to associate the identified individuals with demographics data of interest to advertisers, and 3) the ability to dynamically display media segments based on the profile of the local traffic at that time.

A number of known prior art methods of individual identification require active cooperation on the part of the person to be identified, such as retina scanning for secure area access or swiping a magnetic identification card in a reader. Obviously these technologies would be impractical for use in unrestricted public spaces which represents the majority of the Digital Signage market.

Other known prior art methods of individual identification require passive cooperation on the part of the person to be identified, such as what is described in Boyd/U.S. Pat. No. 6,484,148, the disclosure of which is herein incorporated by reference, wherein unique "signature signals" from wireless devices such as a cell phones carried by users are captured, and then associated to the user through the user's account information. The problem with this kind of identification system is that it requires cooperation by the third party service provider who holds the account information of the user. Because of privacy concerns this information would not likely be released without user consent, or if it were, would not likely withstand public scrutiny. As a result, this kind of system would be limited to users who provide passive cooperation and "opt-in," thereby limiting the pool of identifiable local traffic below the necessary threshold.

A number of known prior art methods use camera-based visual pattern recognition for individual identification. The state of the art in this field continues to improve the accuracy of the identification process, the ability to identify in real time from a field of multiple individuals, and the ability to identify individuals at farther distances from the camera. All of these trends improve the potential usefulness of visual pattern recognition as an individual identification technology within the field of this invention. However, to date none of the prior art methods describe a media targeting system that can effectively associate the individual identification with meaningful consumer profile information without active or passive cooperation on the part of the user, thereby limiting the system's ability to develop a robust, large-scale database.

The present invention addresses the deficiencies in the prior art and facilitates the development of a robust media targeting system by using visual pattern recognition in conjunction with transaction data collected at the point of purchase.

To draw the distinction between the prior art in visual pattern recognition and this present invention more clearly, the present invention is focused specifically on identification for use in conjunction with a robust media targeting system. It uses visual pattern recognition at a retail point-of-purchase transaction point for initial association with the consumer and the consumer's profile information, and then uses the visual identification indices to deliver targeted advertising on a Digital Signage network at any future time at locations separate from the initial retail point-of-purchase transaction point.

The present invention is therefore novel in its application of visual pattern recognition technology, and unique in its capabilities, in that it addresses all of the requirements for developing a large scale robust media targeting system whereas prior art has not.

SUMMARY OF THE INVENTION

It is an object of the present invention to provide a robust media targeting system and method that overcomes many of the disadvantages of prior art arrangements.

It is another object of the present invention to provide a substantially automated system and method for identifying consumer profile information through the use of visual pattern recognition technologies in conjunction with retail point-of-purchase transactions.

It is another object of the invention to provide a system and method to rapidly build a large-scale database of consumer profile data with visual pattern recognition based indices.

It is another object of the invention to provide a system and method to deliver other useful targeting capabilities while the robust large-scale database is being built.

It is another object of the invention to provide a media targeting system that delivers some additional commercial uses beyond increasing media value on a Digital Signage network, so as to further accelerate widespread adoption of the technology.

It is a further object of the invention to provide a system and method to deploy demographically-targeted advertising on digital networks which does not require additional visual recognition hardware, so that advertiser momentum can be created during the buildup phase of the more robust visual pattern recognition based targeting.

BRIEF DESCRIPTION OF DRAWINGS

FIG. 1 illustrates block diagram of a system according to one embodiment of the present invention.

FIG. 2 illustrates block diagram of a system according to another embodiment of the present invention, showing wide area connectivity to external databases.

FIG. 3 illustrates block diagram of a system according to another embodiment of the present invention, showing an alternate configuration of the retail location hardware.

FIG. 4 illustrates block diagram of a system according to another embodiment of the present invention, showing an alternate configuration of the advertising location hardware.

FIG. 5 illustrates block diagram of a software program according to another embodiment of the present invention, showing the development of a staging database for use by a media scheduling program.

FIG. 6 illustrates block diagram of a software program according to another embodiment of the present invention, showing the use of the staging database by a media scheduling program for determining which ad to run next.

FIG. 7 illustrates block diagram of the Multi-Level Demographics Targeting System according to another embodiment of the present invention.

FIG. 8 illustrates block diagram of a method for estimating a demographics profile of visitors of a facility according to another embodiment of the present invention, whereby home addresses are estimated using a simple inverse relationship between distance and number of visitors.

DETAILED DESCRIPTION OF PREFERRED EMBODIMENT

In the following description of the preferred embodiment of the present invention, the term "demographics" is used frequently. While this term is sometimes used within the media industry to describe a finite set of commonly used population characterization criteria (such as age, income, and race), the term as used herein in the broadest possible sense as in "any characteristics of human populations and population segments used to identify consumer markets."

FIG. 1 illustrates an Media Targeting System 100 according to one embodiment of the invention which includes Visual Pattern Recognition System (VPRS) 102, Transaction Monitoring System 103, and Point-of-Sale Terminal 104 located at the Retail Location 101; connected over a Wide Area Network (WAN) communications network 105 to a separate Digital Signage Advertising Location 106 is another Visual Pattern Recognition System 107 which is in communication with the Advertising Delivery System 108.

The Media Targeting System 100 uses any number of available VPRS technologies, typically of the face recognition class, to establish individual identification of the consumer while they are conducting some kind of financial transaction at a Point-of-Sale ("POS") Terminal 104 within a Retail Location 101. The VPRS technology (102 and 107) must be capable of reasonably accurate levels of individual identification within close proximity to the camera (as would be the case at VPRS location 102), as well as preferably more distant locations typical of Digital Signage applications situated in larger common areas of a facility containing the Advertising Location 105.

The VPRS technology (102 and 107) should also be one that establishes an identification profile without requiring an initial reference image, and is able to capture the identification information within a fraction of a second. It would also be necessary to use technology which would allow for capturing and comparing against a database of previously collected identifications using mainstream computing and storage capabilities, so as to allow identification and delivery of a targeted ad while the local traffic is walking past by the Advertising Location 106. For those familiar in the art it is known that several VPRS technologies exist which meet this criteria: the primary variable being what percentage of accurate identifications are possible. Significant research continues to be done in this area which will likely result in continued improvement of accuracy levels over time. For the purpose of the present invention, current VPRS technologies meet the minimal accuracy levels required for at least some percentage of the applications so as to make the invention commercially useful, and future improvements will therefore expand the usefulness rather than establish it.

Referring again to the system configuration at the Retail Location 101 shown in FIG. 1, the VPRS 102 system is generally connected to an intermediary Transaction Monitoring System (TMS) 103, which is in communication with the relevant portions of a traditional POS Terminal's 104 data stream. The TMS 103 collects the identification data from the VPRS 102 sub-system and associates it with current transaction data being generated at POS Terminal's 104.

The TMS 103 collects some or all of the information generated during the transaction, and forwards this and the associated identification information made by the VPRS 102 during the course of the transaction over a Wide WAN 105 to the Media Targeting Data Warehouse (MTDW) storage system 109 (as shown in FIG. 2). The MTDW 109 is typically a structured relational database of some kind, and is designed to collect transaction data and other available demographic information on the consumers that have been identified by the Media Targeting System 100. The MTDW 109 database is typically indexed on the VPRS 102 identification value (for which there is a one-to-one correlation with each consumer represented in the database) for rapid insertions and searches.

When the transaction at POS Terminal 104 includes a payment by credit card, check, customer loyalty, or ATM card where standard consumer identification information is also included (such as name and address or driver's license number), then the TMS 103 can forward this information to the MTDW 109 database along with the other transaction data. This is particularly relevant in that once an association is made between the VPRS 102 identification value and other standard identification reference points, the MTDW 109 database can use other Third-Party Databases 110 to build more depth into the consumer profile (as shown in FIG. 2). For example, demographic data such as age and income range, which are very useful media targeting criteria, could be added to the MTDW 109 database using third-party databases containing this information; this would be in addition to the transaction histories and shopping pattern information being generated directly by the Media Targeting System 100. Individually, each of these are data types would be of interest to advertisers when directing advertising out onto a Digital Signage network; however, having both types increases the media value substantially.

Referring again to the system configuration at the Advertising Location 106 shown in FIG. 1, the VPRS 107 sub-system is connected to the Advertising Delivery System 108. The VPRS 107 is similar to the VPRS 102 sub-system in the Retail Location 101, except that the camera is typically set for a more distant focal range since it would typically be covering a section of the common area of the facility, monitoring consumer traffic as they walked passed the Advertising Delivery System 108. The Advertising Delivery System 108 would be either a visual- or audio-based advertising delivery system (or both) designed to deliver the targeted ads to consumers within the visual or audio range of the Advertising Delivery System 108. In some cases, this would be while walking past a stationary point where the Advertising Delivery System 108 was installed; in other cases, the Advertising Delivery System 108 would be located in areas where consumers typically loitered for longer periods of time. In either event, the architecture of the system would be similar, except that in some cases the window of time available to establish the identification and deliver a targeted ad might be less.

Referring again to the WAN 105 connections shown in FIG. 1, the TMS 103 sub-system would usually share the existing WAN 105 connection of the POS Terminal 104, although it could also use a separate WAN connection. The VPRS 102 sub-system would typically be situated on a local bus, in direct communication with the TMS 103.

An alternate configuration of the Retail Location 101 hardware would be an integrated system as shown in FIG. 3, wherein the TMS 112 and VPRS 113 sub-systems are embedded directly into the POS Terminal 111 hardware system.

Similarly, FIG. 4 shows an alternate configuration of the Advertising Location hardware. In this configuration, an Ad Management System (AMS) 117 is inserted between the VPRS 116 sub-system and the Advertising Delivery System 118. The AMS serves a similar function to the TMS 103 in the Retail Location system by facilitating media targeting functionality as a retrofit to an existing ADS system, or as an add-on to an existing ADS architecture.

Referring again to FIG. 2, after a period of time following deployment of the Retail Location 101 equipment, the MTDW 109 database would have some number of retail transactions stored, along with the associated identification values generated by the VPRS 102 system (shown in FIG. 1). At the Advertising Location 106, any of the consumers previously identified who came within range of the ADS 108 (shown in FIG. 1) would be identified by the VPRS 107 (shown in FIG. 1).

FIG. 5 illustrates a computer program flowchart which would run on the Advertising Location 106 system, in accordance with one embodiment of the invention. This section of the code would generate a list of identified consumers and their related targeting data during the current ad cycle, which would in turn be used by the media scheduling engine to determine which ad to run next.

The first step 121 would be a loop comparing identification values generated by the VPRS (107 or 116) at the Advertising Location 106 from consumers who were within view of the VPRS (107 or 116) camera. For the purpose of illustration, assume that the structure of the identification value is an integer between 1 and 300 million. Each recognized face would generate a unique number, which would be used during section 121 of the program to compare against a database of numbers (typically indexed on this field) to determine if there the number is already contained in the database.

A more complex VPRS identification system might have multiple indices on which the identification is made, and return a probability of a match rather than a simple "yes/no" response. In this case, section 102 of the program would be searching the MTDW 109 database on more than one field, evaluating the probability based on the appropriate algorithms, and generating a match when the probability exceeded the level established by the Advertising Location Software Program 120.

In either case, section 121 of the program would continue to look for what was determined to be a "match" with a consumer identification entry already in the MTDW 109 database. Because of the continuous monitoring nature of this loop, it would probably be more efficient to maintain a local copy of the MTDW 109 identification values rather than run the locally generated values over the network and have the computer system adjacent to the MTDW 109 database conduct the searches. In addition, it may be appropriate to have additional targeting related fields also stored locally.

Once a match is made, the program exits the section 121 loop and moves to the code specified in section 122. In section 122, the program would collect any relevant targeting related fields contained in the remote MTDW 109 database for the identified consumer to a local database, along with any additional targeting related fields contained locally, to a Staging Database 123 (FIG. 2). The Staging Database 123 is designed for temporary storage of all relevant data for consumers generating a match during the section 121 program. It continues to collect new entries during each ad cycle, and is flushed at the end of each ad cycle.

Referring to FIG. 6, a Media Scheduling Engine software program 124 would determine which advertisement to run based on entries contained in the Staging Database 123 and other business rules employed by that program. On the initiation of a new ad cycle 125, the Staging Database 123 would be accessed to determine if there were any entries in it, and whether the identification time stamp suggests that the consumer is still in range of the Advertising Delivery System 108. If not, then whatever ad would normally be run by the Media Scheduling Engine 124 would be run during the upcoming ad cycle 127. If, on the other hand, the section 126 decision tree returns a positive response then the Media Scheduling Engine 124 would modify the upcoming ad to one based on the algorithm represented in section 128. This algorithm 128 would use the fields in the Staging Database 123 and other business rules to determine the most "appropriate" ad to run. Appropriateness in terms of media targeting would generally relate back to the largest incremental increase in ad value generated by the available ads to be run and the demographic profile of the identified consumers in range of the Advertising Delivery System 108 at that point in time.

In consideration of the aforementioned aspects of the present invention, it is clear that the Media Targeting System 100 is capable of generating a large database of identifiable consumers if deployed into a sufficiently large number of retail transaction points. Unlike targeting methods described in prior art, the present invention does not require active or passive participation by the consumer during the identification process, or during the consumer demographic association processes that follow. These deficiencies in the prior art represent substantial impediments to building a large-scale database.

Furthermore, given the fact that the current incremental cost structure for adding this capability to the Retail Location 101 and the Advertising Location 105 hardware is relatively low, the potential for commercial success of the invention is improved. To the extent that this incremental cost must be evaluated against the incremental advertising revenues capable of being generated by the Media Targeting System 100 as a result of the targetability of the media, any increase in value to the Point-of-Sale Terminal 104 would improve these dynamics and therefore accelerate the proliferation of the VPRS 102 systems necessary to build the MTDW 109 database.

One possible byproduct of the identification system installed at the Point-of-Sale Terminal 104 would be its use to decrease fraudulent transactions. Clearly, fraud represents a substantial cost to the industry and to the extent that a system like this one could be used to decrease fraud, there would be an opportunity to improve adoption of the system by the retailers. Without some incentive like this, the retailers would have limited incentive to add the necessary hardware to the Point-of-Sale Terminal 104, even if it were provided at no cost to them.

Another possible byproduct of the identification system installed at the Point-of-Sale Terminal 104 would be its use as a platform for providing public-space identification and tracking of suspects for Homeland Security officials.

Because the Media Targeting System 100 uses Visual Pattern Recognition technology to identify consumers, the system could also be used to provide the retailer at the Point-of-Sale Terminal 104 real-time feedback on the identification, if constructed properly.

While the VPRS-based Media Targeting System 100 represents exceptionally fine demographics targeting capabilities in that it is able to recognize specific individuals and therefore associate very specific demographics to them. It also has parallel benefits in the areas of consumer fraud deterrence and Homeland Security, thereby allowing for accelerated adoption by the market. However, in spite of these positive attributes, the system ultimately requires deploying new application-specific hardware and systems into the field in order to build the targeting database.

Because of the fact that the advertising industry has historically resisted adoption of new media models and methods until they can absorb large amounts of advertising dollars, the market introductory phase for the present invention will likely require significant amounts of capital in order to overcome this inertia. One method for reducing this introduction inertia is represented by the block diagram shown in FIG. 7. The diagram shows three levels of demographics targeting, each requiring additional system components to facilitate while providing incremental improvement in the "granularity" of the demographics (the ability to distinguish consumer-specific demographics as opposed to applying the same demographic profiles to a group of consumers which are actual or estimated weighted averages of the sample population).

Level One (129) uses the U.S. Census Bureau's demographics databases to generate a demographics profile for the consumers likely to be in range of an advertising device. Because of the fact that the Census database can use a home address, neighborhood, or other larger geographic area as an index to retrieve a variety of demographics data, any advertising device which can associate home address (or neighborhood, city, county, state, ZIP code, etc.) of the consumer or consumers who are likely to be in range of it can be converted to "Demographics-Associated Advertising Device."

In Wachob/U.S. Pat. No. 5,155,591, the disclosure of which is herein incorporated by reference, demographics data for the consumer is associated with a TV receiver unit which is in turn used for targeted advertising purposes; as such, this would be an example of a where a TV receiver unit is used as a Demographics-Associated Advertising Device ("DA/AD"). This model for the targeting of advertising is fundamentally different from the other more common methods for targeted advertising, such as Program Association in the case of broadcast TV (where the demographics profile of the audience who typically watches a given Program is used) or Search Word Association on the Internet (where search terms are used as the basis of establishing demographics of interest to the advertiser).

While U.S. Pat. No. 5,155,591 describes a particular kind of Demographics-Associated Advertising Device, it does not describe methods to build the demographics profile based on Census data. In Shaffer/U.S. Pat. No. 6,748,426, the disclosure of which is herein incorporated by reference, the inventor describes methods to build a demographics profile based on Census data and use it to convert a consumer's networked personal computer into a Demographics-Associated Advertising Device. This model could be described as a Census-Developed Demographics-Associated Advertising Device ("CD/DA/AD") of Networked Personal Computers type.

In a pending patent application of the present inventor (document number 20020165781), a media management system is described which facilitates planning, buying, and managing advertising campaigns on networks of Demographics-Associated Advertising Devices. In one embodiment of that invention, the Media Management System allows a media planner/buyer to view multiple types of Demographics-Associated Advertising Device networks within the same media planning interface simply by selecting any one of several such networks which are made available by the system. For example, the media type might be a network of personal computers using systems described in U.S. Pat. No. 6,748,426. Alternatively, the media type could be a demographically-targetable Digital Signage network as represented by numerous examples within the 20020165781 application. In addition, multiple media types or all available media types can similarly be viewed and used for planning and buying media on, within the same media planning interface and in conjunction with the same ad campaign. As can be appreciated by one of ordinary skill in the art, this ability to plan and deploy ad campaigns across ad mediums which are traditionally separated could create substantial campaign processing efficiencies and generally improve the correlation between the advertiser's desired impressions and actual impressions generated during a given ad campaign for a given budget.

It is therefore desirable to maximize the number and size of DA/AD networks so that the media planning system described in 20020165781 will gain commercial acceptance more readily. In particular, it would be beneficial to identify and design other CD/DA/AD types of networks beyond Networked Personal Computers as described in U.S. Pat. No. 6,748,426, since the Census data and address association is readily available and efficient to use in developing an initial demographics profile.

Subscriber-based advertising devices, including cable or satellite TVs, mobile phones and PDAs, and satellite radio systems are perhaps the easiest to convert into a CD/DA/AD network: the subscriber's address is generally a part of the provider's database and can therefore be used to develop the CD/DA/AD profile.

Other presently-envisioned networks do not have actual subscribers, but may have other methods for determining the consumer's address that is in range of the advertising device. One such network would be In-Flight Entertainment systems located in airline seat-backs; these are particularly useful wherein the consumer's seat is pre-assigned and therefore the consumer's addresses are available within the airline's database. In the case of unassigned seating in that the average demographic profile for the passenger group could be created using the entire set of home addresses.

Public-space advertising devices such as Digital Signage networks generally lack the ability to identify a subscriber and associate the home address in order to build the CD/DA/AD profile. However, varying levels of accuracy can be achieved in estimating the home addresses of the target populations, depending on the Digital Signage environment. For example, most regional mall marketing organizations develop traffic profiles which estimate the number of visitors to the mall and where those visitors come from (what percent from what city). This is done as a matter of course in order to optimize their own advertising campaigns and develop actionable profiles of their customer base.

In the absence of any formal customer profiling information, a first-order estimation could be developed by assigning percentages of traffic to each of a number of ever-wider radii around the facility, as shown in FIG. 8; the reasoning being that the number of visitors to a given location are generally inversely proportional to the distance they would need to travel from their home to get there. In this example, three radii are used: Radius X (132) which is estimated to include 50% of the total traffic to the facility housing the Digital Sign, Radius Y (133) which is estimated to include an additional 25% of the total traffic to the facility housing the Digital Sign, and Radius Z (133) which is estimated to include 100% of the total traffic to the facility housing the Digital Sign. The actual number of radii and estimated percentages would vary depending on what was known about the actual traffic patterns. The demographics profile would be developed by a weighted average of the census data in each of those radii.

A more accurate estimation could be developed in retail locations where the Digital Signs are in the vicinity of payment transaction terminals of some kind (e.g., cash registers), and where the retailer captured consumer address information during the course of at least some percentage of the transactions. In many cases, this kind of information is now captured and maintained by retailers on a regular basis, providing the ability to create a very accurate profile of consumer addresses and, in turn, a demographics profile. This environment also allows for the ability to overlay a real-time element to the historical average in that actual consumer-specific demographics can be created at the time of the transaction. If the Digital Signage displays were in view of the transaction terminal, this could be very useful from a targeting perspective. Even if they were not, the real-time demographics information could be used to identify patterns occurring during certain times of the day or in certain areas within the store (where multiple registers were used); these patterns could then be incorporated into a more robust demographics profile model.

In all of these cases, the corresponding media distribution system (like that described in patent application Document Number 20020165781 by the present inventor, now pending) would view the Digital Sign or consumer entertainment appliance as having the estimated (or actual) number of identical consumers in view at a particular point in time, each having the same estimated demographics profile. Where additional real-time demographics profile data was available, the total profile of consumers in range of the advertising device (e.g., Digital Sign) could be modified as appropriate. For example, if the Digital Signage system recognized 5 individuals in range at the transition point to the next ad cycle and one was uniquely identified by a transaction currently occurring at the register, the profile would be modeled as four individuals with the current default (average) profile and one with the actual profile determined by the register transaction activity.

Capturing actual traffic "head-count" information would also be useful from an advertiser's perspective, even without additional demographics information being captured. It is well known within the advertising industry that one of the greatest deficiencies of most traditional advertising mediums is their inability to accurately track actual viewer impressions. There are currently numerous methods and technologies designed for simple traffic counting in commercial facilities.

One relatively new commercial technology is demonstrated by Advanced Interfaces, Inc. of State College, Pa. Using cameras and customized visual recognition software, the company's Media Intelligence solution can estimate the general demographics characteristics of individuals in the field of view of the camera. These demographics include age range, gender, and race of the individual. In a preferred embodiment of the present invention, this kind of demographics estimation using real-time image analysis could be used as a second level (130) of the Multi-Level Demographics Targeting System shown in FIG. 7.

The third level of the Multi-Level Demographics Targeting System shown in FIG. 7 is the Media Targeting System 100, which would provide individual identification capabilities and more detailed demographics information.

Other types of initial demographics association with visual identification systems and methods may also be used. For example, instead of the visual identification system being located in conjunction with a retail transaction terminal, it might be done during a videophone session between the consumer and a cooperating business; the visual identification in this place would still take place in a similar manner, using visual pattern recognition technologies of some kind, but the association with the consumer-identifying data could be done by associating the consumer's CallerID if available, or in conjunction with a transaction taking place between the consumer and the business . . . the two required components are the ability to visually identify the consumer and the ability to identify some other actionable data about the consumer (address, full name, credit card number, etc.).

Other types of secondary consumer identification systems and methods may also be used. For example, instead of the system utilizing POS transaction data, the visual identification system may be able to acquire wireless MAC addresses from a wireless mobile device carried by the consumer, and could cross reference the MAC address to some other personal identification information for the consumer.

The present invention addresses the deficiencies in prior art by utilizing a range of demographics estimation technologies and methods: a baseline estimation which can automatically generate demographics profiles based on correlation of U.S. Census Bureau data and known information about the consumer traffic, an additional level of detail using real-time image analysis technologies which require the addition of appropriate camera hardware and analysis software to the Digital Sign, and the third level of detailed demographics using systems associated with transaction terminals and appropriate cameras and systems on the Digital Sign and network.

The present invention is therefore novel in its application of demographics estimation technologies, and unique in its capabilities, in that it addresses the stated deficiencies in the prior art.

Although this invention has been illustrated by reference to specific embodiments, it will be apparent to those skilled in the art that various changes and modifications may be made which clearly fall within the scope of the invention. The invention is intended to be protected broadly within the spirit and scope of the appended claims.

What is claimed is:

1. A computer system estimating a demographic characteristics profile of consumers in the vicinity of a publicly located advertising device, wherein said advertising device is configured to communicate advertising messages to a plurality of consumers within the vicinity of said advertising device, said system comprising:
   a memory;
   a processor configured to:
      identify a physical address of an advertising device;
      identify one or more census demographics characteristics associated with a first geographic area, the first geographic area associated with said physical address and store said census demographics characteristics associated with the first geographic area as a first demographics profile in said memory;
      identify a second geographic area a predetermined distance from said physical address;
      identify one or more census demographics characteristics associated with said second geographic area and store said census demographics characteristics associated with said second geographic area as a second demographics profile in said memory; and
      combine said first demographics profile and said second demographics profile into a combined demographics profile; wherein the combination is a weighted average of the first and the second demographics profiles, wherein the weighting factor is not equal to one.

2. The system of claim 1, wherein said first demographics profile carries a higher weighting than the second demographics profile.

3. The system of claim 1, wherein said processor is further configured to deliver targeted advertising to said advertising device, said targeted advertising being selected in part based on the said combined demographics profile.

4. The system of claim 1, wherein said processor is further configured to:
   receive retail transaction data relating to transactions occurring in the vicinity of said advertising device, wherein said retail transaction data includes consumer address information;
   identify one or more census demographic characteristics associated with said consumer address information and store said census demographic characteristics associated with said consumer address information as a third demographics profile in the memory;
   combine said combined demographics profile and said third demographics profile to create a refined demographics profile, wherein said refined demographics profile is a weighted average of the combined and the third demographics profiles.

5. The system of claim 4, wherein said weighted average of the combined and third demographic profiles is based in part on an estimate of the number of consumers in the vicinity of the said advertising device at the time of the said transaction.

6. The system of claim 1, wherein the processor is further configured to:
   estimate one or more real-time demographics characteristics of consumers in said vicinity of said advertising device and store said real-time demographics characteristics as a third demographics profile in memory, said estimation system using visual pattern recognition techniques; and
   combine said combined demographics profile and said third demographics profile into a refined demographics profile, wherein said refined demographics profile is a weighted average of the combined and the third demographics profiles.

7. The system of claim 6, wherein said weighted average of the combined and third demographic profiles is based in part on an estimate of the number of consumers in the vicinity of the said advertising device at the time of the said visual pattern recognition.

8. The system of claim 1, wherein the processor is further configured to:
acquire a unique electronic serial number or MAC address of a wireless mobile device in the vicinity of said advertising device;
identify consumer address information associated with said wireless mobile device;
identify one or more census demographic characteristics associated with said consumer address information and store as third demographics profile in memory; and
combine said combined demographics profile and said third demographics profile into a refined demographics profile, wherein said refined demographics profile is a weighted average of the combined and the third demographics profiles.

9. The system of claim 8, wherein said weighted average of the combined and third demographic profiles is based in part on an estimate of the number of consumers in the vicinity of the said advertising device at the time of the said MAC address acquisition.

10. A method for estimating, by a processor of a computer system, a demographic characteristics profile of consumers in the vicinity of a publicly located advertising device, wherein said advertising device is configured to communicate advertising messages to a plurality of consumers within the vicinity of said advertising device, said method comprising:
identifying, using a processor of a computer system, a physical address of an advertising device;
identifying, using said processor of said computer system, one or more first census demographics characteristics associated with a first geographic area, the first geographic area associated with said physical address
storing said one or more first census demographics characteristics as a first demographics profile in a memory;
identifying, using said processor of said computer system, a second geographic area a predetermined distance from said physical address;
identifying, using said processor of said computer system, one or more second census demographics characteristics associated with said second geographic area;
storing said one or more second census demographics characteristics as a second demographics profile in said memory; and
combining, using said processor of said computer system, said first demographics profile and said second demographics profile into a combined demographics profile, wherein the combination is a weighted average of the first and the second demographics profiles, wherein the weighting factor is not equal to one.

11. The method of claim 10, further comprising delivering targeted advertising to said advertising device, said targeted advertising being selected in part based on the said combined demographics profile.

12. The method of claim 10, wherein the first demographics profile carries a higher weighting than the second demographics profile.

13. The method of claim 10, further comprising:
receiving retail transaction data from transactions occurring in the vicinity of said advertising device, wherein said retail transaction data includes consumer address information;
identifying one or more third census demographic characteristics that are associated with said consumer address information;
storing said one or more third census demographic characteristics as a third demographics profile in memory, and;
combining said combined demographics profile and said third demographics profile into a refined demographics profile, wherein said refined demographics profile is a weighted average of the combined and the third demographics profiles.

14. The method of claim 13, wherein said weighted average of the combined and third demographic profiles is based in part on an estimate of the number of consumers in the vicinity of the said advertising device at the time of the said transaction.

15. The method of claim 10, further comprising:
estimating one or more real-time demographics characteristics of consumers in vicinity of said advertising device, said estimation system using visual pattern recognition techniques;
storing said one or more real-time demographics characteristics as third demographics profile in memory, and;
combining said combined demographics profile and said third demographics profile into a refined demographics profile, wherein said refined demographics profile is a weighted average of the combined and the third demographics profiles.

16. The method of claim 15, wherein said weighted average of the combined and third demographic profiles is based in part on an estimate of the number of consumers in the vicinity of the said advertising device at the time of the said visual pattern recognition.

17. The method of claim 10, further comprising:
acquiring a unique Electronic Serial Number or MAC address of a wireless mobile device in the vicinity of said advertising device;
identifying consumer address information associated with said wireless mobile device;
identifying one or more third census demographic characteristics that are associated with said consumer address information;
storing said one or more third census demographic characteristics as a third demographics profile in memory, and;
combining said combined demographics profile and said third demographics profile into a refined demographics profile, wherein said refined demographics profile is a weighted average of the combined and the third demographics profiles.

18. The method of claim 17, wherein said weighted average of the combined and third demographic profiles is based in part on an estimate of the number of consumers in the vicinity of the said advertising device at the time of the said MAC address acquisition.

* * * * *